United States Patent [19]
Yu

[11] Patent Number: 5,400,234
[45] Date of Patent: Mar. 21, 1995

[54] LIGHT

[76] Inventor: Abraham Yu, No. 9-9, Lane 8, Sec. 1, Cheng Tai Rd., Wu Ku Hsiang, Taipei Hsien, Taiwan, Prov. of China

[21] Appl. No.: 207,741

[22] Filed: Mar. 9, 1994

[51] Int. Cl.$^6$ ............................................. F21Y 21/00
[52] U.S. Cl. ................................. 362/386; 362/399; 362/419
[58] Field of Search ............... 362/382, 388, 386, 399, 362/418, 419, 431

[56]     References Cited
U.S. PATENT DOCUMENTS

| | | | |
|---|---|---|---|
| 2,747,079 | 5/1956 | Kubiliunas | 362/388 |
| 3,197,631 | 7/1965 | Jensen | 362/431 |
| 3,479,500 | 11/1969 | Duddy | 362/388 |
| 4,678,153 | 7/1987 | Maddock et al. | 362/386 |

*Primary Examiner*—Richard R. Cole
*Attorney, Agent, or Firm*—Sixbey, Friedman, Leedom & Ferguson

[57]     ABSTRACT

A light includes a light tube, a housing for receiving the light tube, a handle pivotally linked to the housing, a hook pivotally linked to the handle, a U-shaped brace pivotally linked to the housing; a cap pivotally linked to the U-shaped brace, a hollow post threadably engageable with the cap, a tripod attached to the cap so that the tripod is hidden in the hollow post when the is cap is engaged with the hollow post, a hollow base being pivotally linked to the hollow post and a clip pivotally linked to the hollow base.

7 Claims, 4 Drawing Sheets

LIGHT

BACKGROUND OF INVENTION

The present invention relates to a light which employs a plurality of supporting devices.

There have been many lights with various supporting devices. Some lights are equipped with handles in order to be carried. Some other conventional lights use hooks in order to be hooked on rails or nails fixed on walls. Some other lights are provided with clips in order to be attached to tables or shelves. Some other lights employ tripods in order to be disposed on the ground. However, there has not been any light which employs all of the above-mentioned supporting devices.

SUMMARY OF INVENTION

It is the primary object of the present invention to provide a light which employs a handle, a hook, a clip, a tripod.

DETAILED DESCRIPTION OF PREFERRED EMBODIMENT

Figure 1:
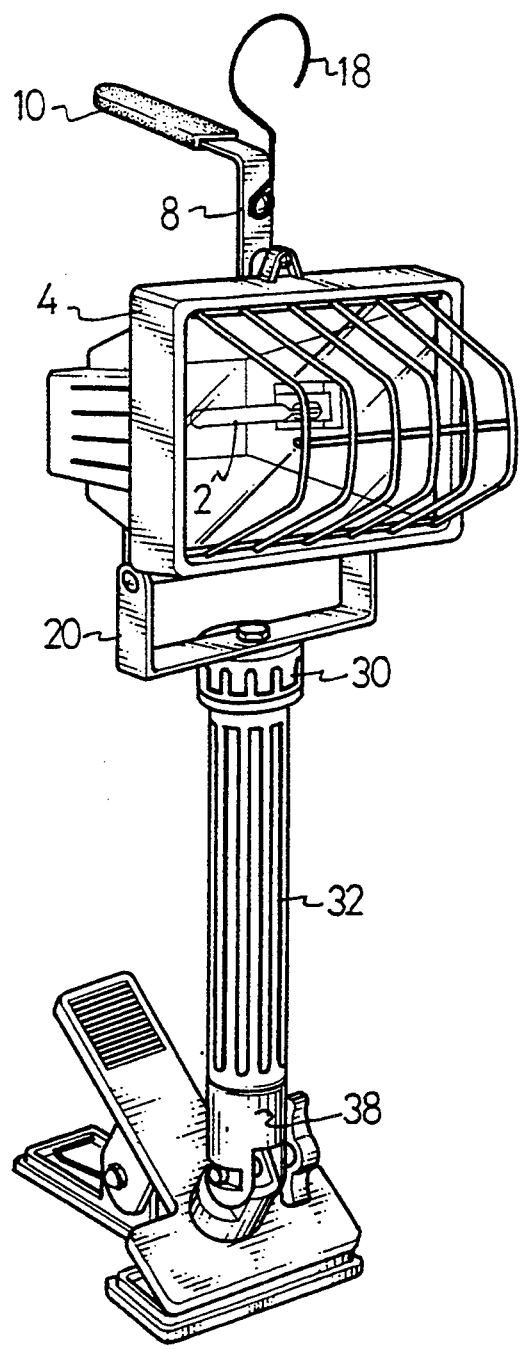
FIG. 1 is a perspective view of a light in accordance with the preferred embodiment of the present invention.
Figure 2:
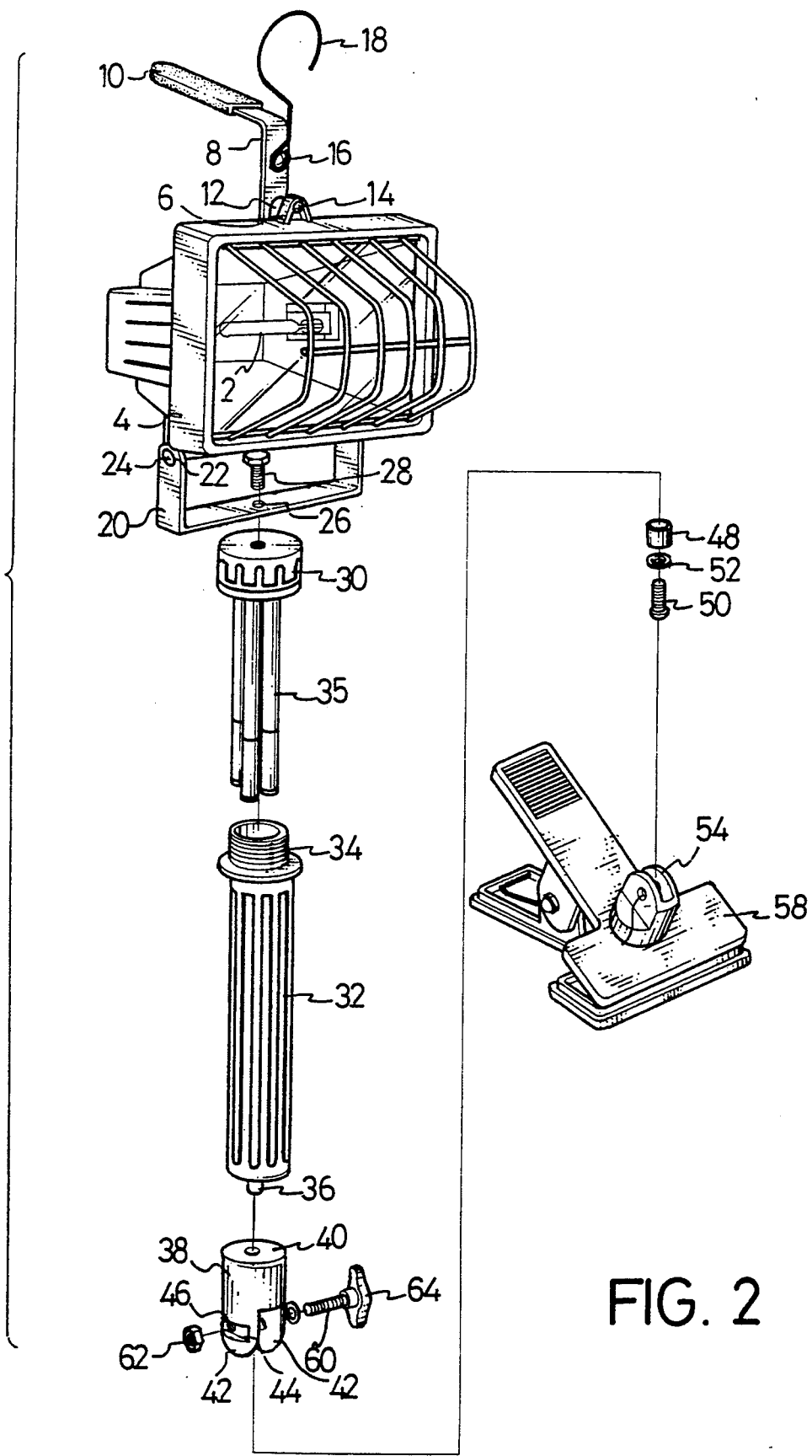
FIG. 2 is an exploded view of the light shown in FIG. 1.

Referring to FIGS. 1 and 2, a light has a light tube 2 which is received in a housing 4. A sleeve 6 is formed on an upper portion of the housing 4. A handle 8 has a first end to which a grip 10 is attached and a second end through which a hole 12 is defined. A screw 14 is inserted through the hole 12 and is secured in the sleeve 6 so as to link the handle 8 to the housing 4. Thus, the light can be carried.

A protrusion 16 is formed the handle 8 between the grip 10 and the hole 12. A portion of a hook 18 is wound about the protrusion 16 so as to link the hook 18 to the handle 8. Thus, the light can be hooked by means of the hook 18 on a rail or a nail (not shown) which is fixed on a wall. The protrusion 16 can be replaced with a screw or the like.

A U-shaped brace 20 has two ends through each of which a hole 22 is defined. Two screws 24 are each inserted through a hole 22 and are each secured in the housing 4 so as to pivotally link the U-shaped brace 20 to the housing 4. A hole 26 is defined through a middle portion of the U-shaped brace 20.

A plastic cap 30 defines a through hole (not numbered) and a recess (not numbered). A screw 28 is inserted through the hole 26 and is secured in the through hole defined in the cap 30 so that the cap 30 is attached to the U-shaped brace 20.

A thread (not numbered) is formed in the recess of the cap 30. A hollow post 32 has an external surface and an internal surface. A thread 34 is formed on a first end of the external surface of the post 32. Thus, the cap 30 is threadably engaged with the hollow post 32 in order to hide a tripod 35 which is linked by means of the screw 28 to the cap 30.

Figure 3:
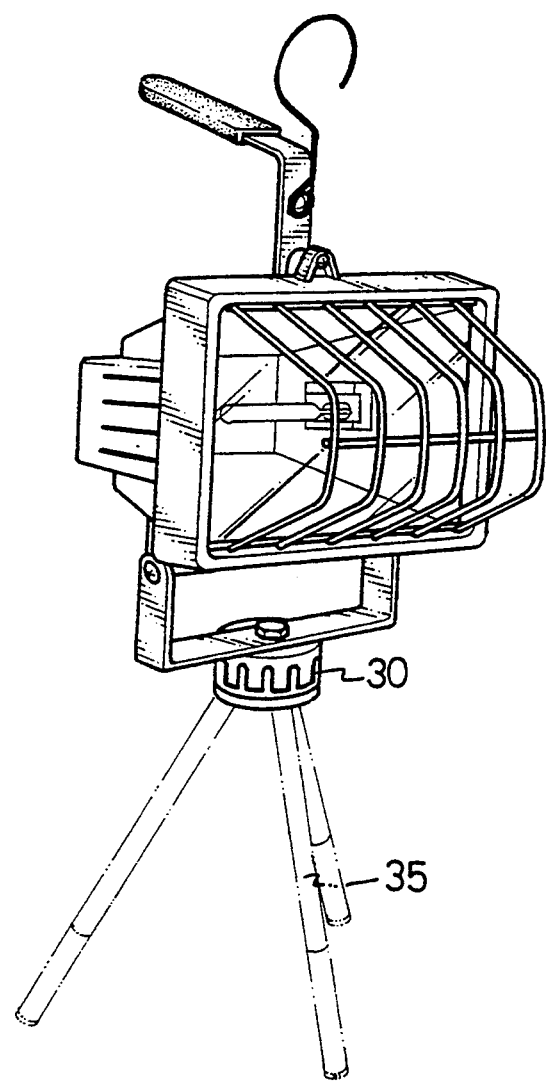
FIG. 3 is a perspective view of the light shown in FIG. 1, showing a tripod supporting the light.

Referring to FIG. 3, the light is supported by means of the tripod 35 on the ground.

Figure 4:
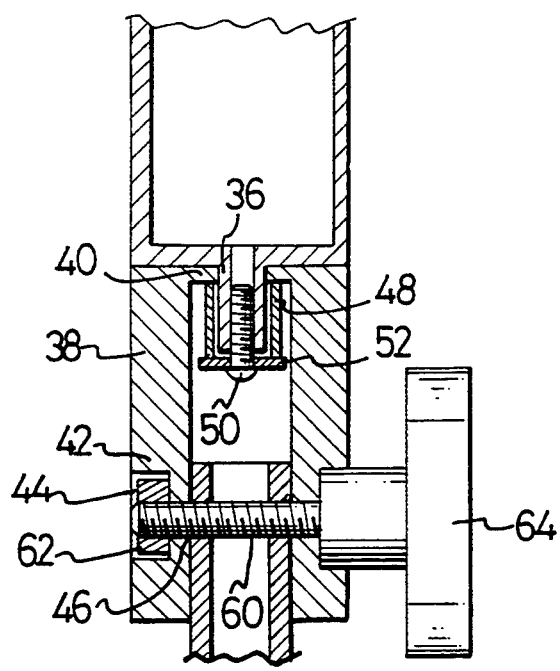
FIG. 4 is a partial cross-sectional view of a post engaged with a clip.

Referring to FIGS. 2 and 4, a sleeve 36 projects from a second end of the hollow post 32. A hollow base 38 has an internal surface and an external surface. An annular flange 40 is formed at a first end of the internal surface of the hollow base 38. Two ears 42 each defining a recess 44 and a through hole 46 are formed on the second end of the hollow base 38. The sleeve 36 is inserted into a first end of the hollow base 38. The sleeve 36 is further inserted in a metal collar 48. A screw 50 is inserted through a washer 52 and is secured in the sleeve 36. Thus, the hollow post 32 is connected with the hollow base 38.

An ear 54 which defines a through hole 56 is formed on a clip 58. The ear 54 is sandwiched between the ears 42. A butterfly bolt 60 is inserted through the holes 46 and 56 and is engaged with a threaded nut 62 which is received in one of the recesses 44. Thus, the hollow post 32 is pivotally linked to the clip 58.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

What is claimed is:

1. A light comprising:
   a light tube;
   a housing for receiving the light tube;
   a handle being pivotally linked to the housing;
   a hook being pivotally linked to the handle;
   a U-shaped brace being pivotally linked to the housing;
   a cap being pivotally linked to the U-shaped brace;
   a hollow post being threadably engageable with the cap;
   a tripod being attached to the cap so that the tripod is hidden in the hollow post when the cap is engaged with the hollow post;
   a hollow base being pivotally linked to the hollow post; and
   a clip being pivotally linked to the hollow base.

2. A light in accordance with claim 1 wherein the hollow post comprises a sleeve which axially projects from the hollow post.

3. A light in accordance with claim 2 wherein the hollow base defines an internal surface and an annular flange formed on the internal surface of the hollow base, the sleeve of the hollow post is insertable through the annular flange of the hollow base.

4. A light in accordance with claim 3 comprising a metal collar into which the sleeve of the hollow post is inserted such that the sleeve of the hollow post does not extend throughout the metal collar, a washer and a screw which is inserted through the washer and is secured in the sleeve of the hollow post so as to pivotally link the hollow post to the hollow base.

5. A light in accordance with claim 1 wherein the hollow base comprises two ears which project therefrom and each define a through hole, and wherein the clip comprises an ear which projects from the clip and defines a through hole, whereby the ear of the clip is sandwiched between the ears of the hollow base.

6. A light in accordance with claim 5 comprising:

a butterfly bolt being insertable through the through holes defined in the ears of the hollow base and the clip; and a threaded nut being engageable with the threaded bolt.

7. A light in accordance with claim 5 wherein a first one of the ears of the hollow base defines a recess in communication with the through hole defined in the first ear of the hollow base in order to receive the threaded nut.

* * * * *